US010565204B2

(12) United States Patent
Bensberg et al.

(10) Patent No.: US 10,565,204 B2
(45) Date of Patent: Feb. 18, 2020

(54) HASH COLLISION TABLES FOR RELATIONAL JOIN OPERATIONS

(71) Applicant: SAP SE, Walldorf (DE)

(72) Inventors: Christian Bensberg, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 624 days.

(21) Appl. No.: 15/350,798

(22) Filed: Nov. 14, 2016

(65) Prior Publication Data

US 2018/0137163 A1   May 17, 2018

(51) Int. Cl.
G06F 17/30    (2006.01)
G06F 16/2455  (2019.01)

(52) U.S. Cl.
CPC ................. G06F 16/2456 (2019.01)

(58) Field of Classification Search
CPC .................................. G06F 16/2456
USPC ......................................... 707/691
See application file for complete search history.

(56) References Cited

U.S. PATENT DOCUMENTS

| | | | | |
|---|---|---|---|---|
| 6,081,805 A * | 6/2000 | Guha | ............... | G06F 16/24556 |
| 6,421,662 B1 * | 7/2002 | Karten | ................. | G06F 16/2237 |
| 6,618,729 B1 * | 9/2003 | Bhashyam | ............ | G06F 16/283 |
| 2011/0202744 A1 * | 8/2011 | Kulkarni | ............. | G06F 12/1018 711/216 |
| 2012/0310974 A1 | 12/2012 | Zhu et al. | | |
| 2014/0214794 A1 * | 7/2014 | Attaluri | ............... | G06F 16/2456 707/714 |
| 2014/0330801 A1 * | 11/2014 | Kaldewey | ........... | G06F 16/2255 707/698 |
| 2015/0220600 A1 * | 8/2015 | Bellamkonda | ...... | G06F 16/2456 707/747 |
| 2015/0286676 A1 * | 10/2015 | Dickie | .................. | G06F 16/244 707/737 |
| 2016/0275078 A1 * | 9/2016 | Attaluri | ............... | G06F 16/2255 |
| 2017/0012874 A1 * | 1/2017 | Lee | ........................ | H04L 45/021 |
| 2017/0091271 A1 * | 3/2017 | Attaluri | ............. | G06F 16/24537 |
| 2017/0255675 A1 * | 9/2017 | Chavan | ..................... | G06F 7/24 |
| 2018/0089261 A1 * | 3/2018 | Li | ......................... | G06F 16/221 |

OTHER PUBLICATIONS

Non-Final Rejection dated Jul. 12, 2019, from U.S. Appl. No. 15/350,852.

* cited by examiner

*Primary Examiner* — Hicham Skhoun
(74) *Attorney, Agent, or Firm* — Sterne, Kessler, Goldstein & Fox P.L.L.C.

(57) ABSTRACT

Disclosed herein are system, method, and computer program product embodiments for incrementally building hash collision tables. In some embodiments, hashes and hash collision tables may be used to improve efficiency of relational operations, such as those used in relational databases. An embodiment operates by determining hash collisions between data entries, then executing a join operation referencing the hash table and the hash collision table to produce a result set.

20 Claims, 5 Drawing Sheets

HASH COLLISION TABLES FOR RELATIONAL JOIN OPERATIONS

CROSS-REFERENCE TO RELATED APPLICATIONS

This application is related to U.S. patent application Ser. No. 15/350,852, entitled "Incrementally Building Hash Collision Tables," filed on Nov. 14, 2016, which is hereby incorporated by reference in its entirety.

BACKGROUND

Hashing operations can be used to increase the efficiency of relational operations, such as join operations used in relational databases, by enabling various data entries to be represented by hash values. In so doing, hash collisions may occur, which may result from different data entries generating the same hash value. Resolving hash collisions while leveraging hashing in database applications may require the use of more complex data structures or more costly hashing operations, which may require additional storage and processing overhead, thereby reducing a substantial benefit derived from hashing.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for making and using hash collision tables for database operations, such as but not limited to relational join operations.

Figure 1:
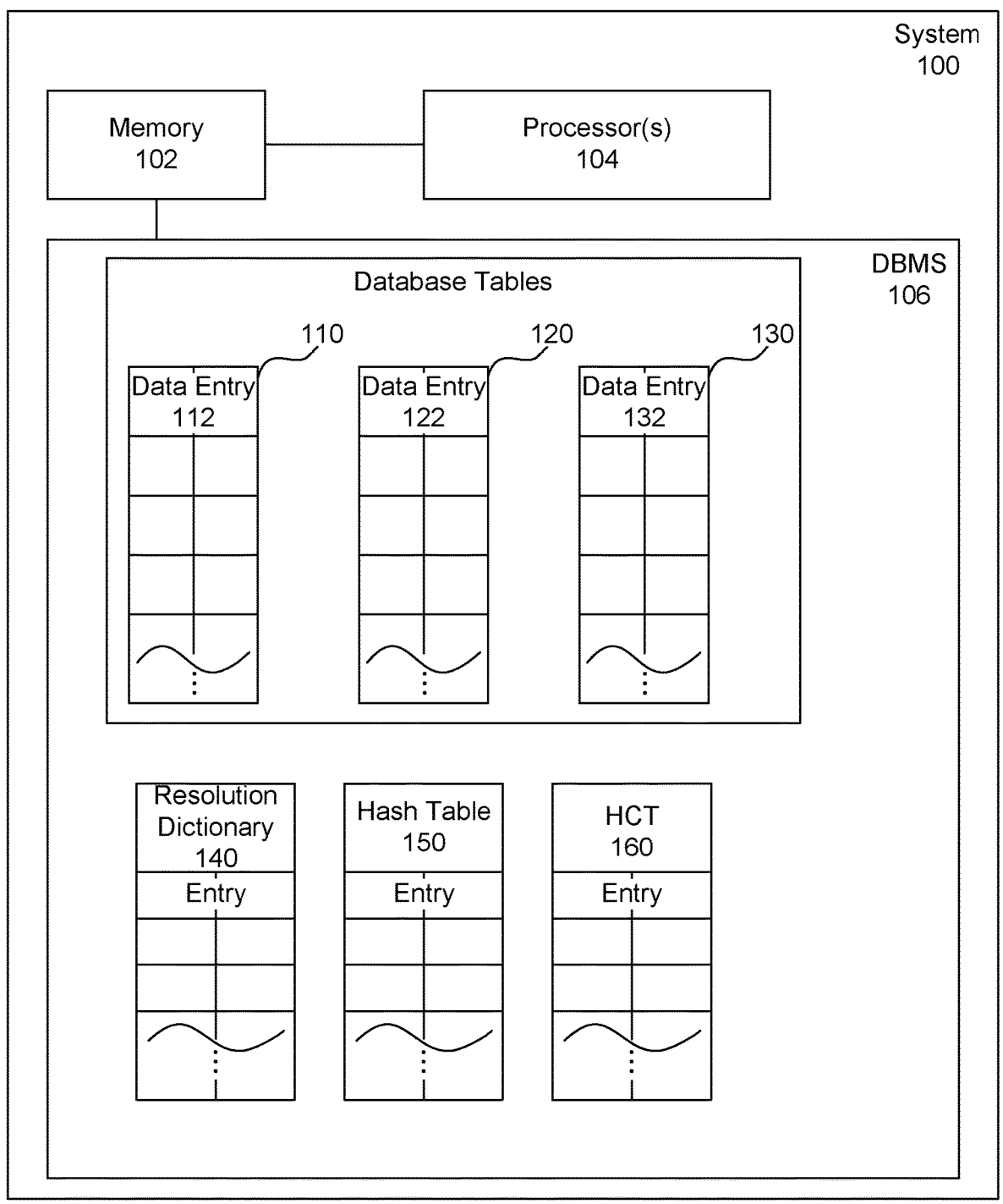
FIG. 1 is a block diagram of a database system that includes hash collision tables for relational join operations, according to some embodiments.

FIG. 1 is a block diagram of a system 100 that includes hash collision tables having incremental build functionality, according to some embodiments. System 100 may comprise hardware (e.g., circuitry, dedicated logic, programmable logic, microcode, etc.), software (e.g., instructions executing on a processing device), or a combination thereof. It is to be appreciated that not all components may be needed to perform the disclosure provided herein.

As shown in FIG. 1, system 100 comprises at least one memory 102 and at least one processor 104 coupled to the memory 102.

Memory 102 may represent a plurality of memory arrays, and processor 104 may include a plurality of processors, such as in a multiprocessing environment, which could further span a plurality of computer systems.

System 100 may include a database management system 106 (DBMS). While running, DBMS 106 preferably resides in memory 102, but may alternatively reside in other storage media. DBMS 106 may include database tables 110, 120, and 130, and each of these database tables 110, 120, and 130 may contain varying numbers of corresponding data entries 112, 122, and 132, and so on. While only three database tables 110, 120, and 130 are shown in the example of FIG. 1, system 100 or DBMS 106 may, in practice, include any number of database tables. Likewise, while only one data entry is shown in each database table, any number of data entries may be present in any database table.

System 100, DBMS 106, or both, may be equipped with circuitry, logic, or software, etc., that may perform operations including but not limited to storing data in storage devices, loading stored data into memory from storage devices, and/or processing data in ways including but not limited to arithmetic, comparisons, vector operations, matrix operations, hash functions, and, across sets of data, relational operations, aggregate operations, and database views, among other functions.

The database tables 110, 120, and 130 may refer to any type of structured data set in a relational model. Such structured data sets may be column-oriented or row-oriented tables, associative arrays, key-value stores, or similar groups of data arrangements or patterned storage, to name a few non-limiting examples.

In some embodiments, a hash table 150 may be used for storing hash values of each corresponding data entry in each corresponding database table 110, 120, and 130. In other embodiments, hash table 150 may include a separate hash table for each database table accessed by system 100 or DBMS 106.

For example, each data entry in a database table may be processed by a hash function to determine a hash value for each data entry. Each hash value corresponding to each data entry may be stored in a hash table 150. Hash table 150 may further include multiple separate hash tables. In some embodiments, each database table may have a corresponding hash table. In other embodiments, there may be multiple database tables for each corresponding hash table.

Hash values may be generated by hash functions. A hash function may take a data entry as input and may produce a hash value as output. Generally, most input data entries, for any given hash function, may each yield a unique hash value. Because of this property of hash values, and due to the fact that hash values tend to be of a consistent fixed length for any given hash function, it is generally less costly in terms of processing overhead to compare hash values rather than directly comparing large data entries when determining whether large data entries are the same or different from each other. Although comparing hashes may be more efficient generally, not all matching hash values may correspond to the same matching data entries. This may happen where there is a hash collision, where one hash value corresponds to multiple unique data entries. In such cases, further processing is needed to resolve the hash collision, as described below.

Hash collision table (HCT) 160 may be used for storing hash collision values for which hash collisions are determined to exist. A hash collision exists where at least two distinct data entries each resolve to the same hash value as a result of the same hash function. Here, a hash value is called a hash collision value in any case where the hash value corresponds to a known hash collision determined to exist in system 100 or DBMS 106. In other words, a hash collision value is output result of one hash function as applied to multiple different input values, such as multiple data entries from at least one database table. In some embodiments, hash collision values in the HCT 160 may be further indexed or referenced for resolution with their corresponding original data values that are distinct from each other for each hash value in the HCT 160.

Some embodiments may further employ a resolution dictionary 140. Resolution dictionary 140 is a separate data structure that may associate a unique identifier, such as a special index value, with a hash value in the hash collision table and its corresponding original data entry values that each result in the same hash collision value of a detected hash collision. By ensuring a unique identifier, such as the special index value, for each original data entry that would result in a hash collision, such unique identifiers may, in some embodiments, be used in place of or alongside the hash values that have collisions, in order to realize the benefits of hashes when performing relational operations with database tables having large data entries. In this way, the problem of hash collisions may be resolved, for example, when using hash values to determine matches in relational join operations.

Figure 2:
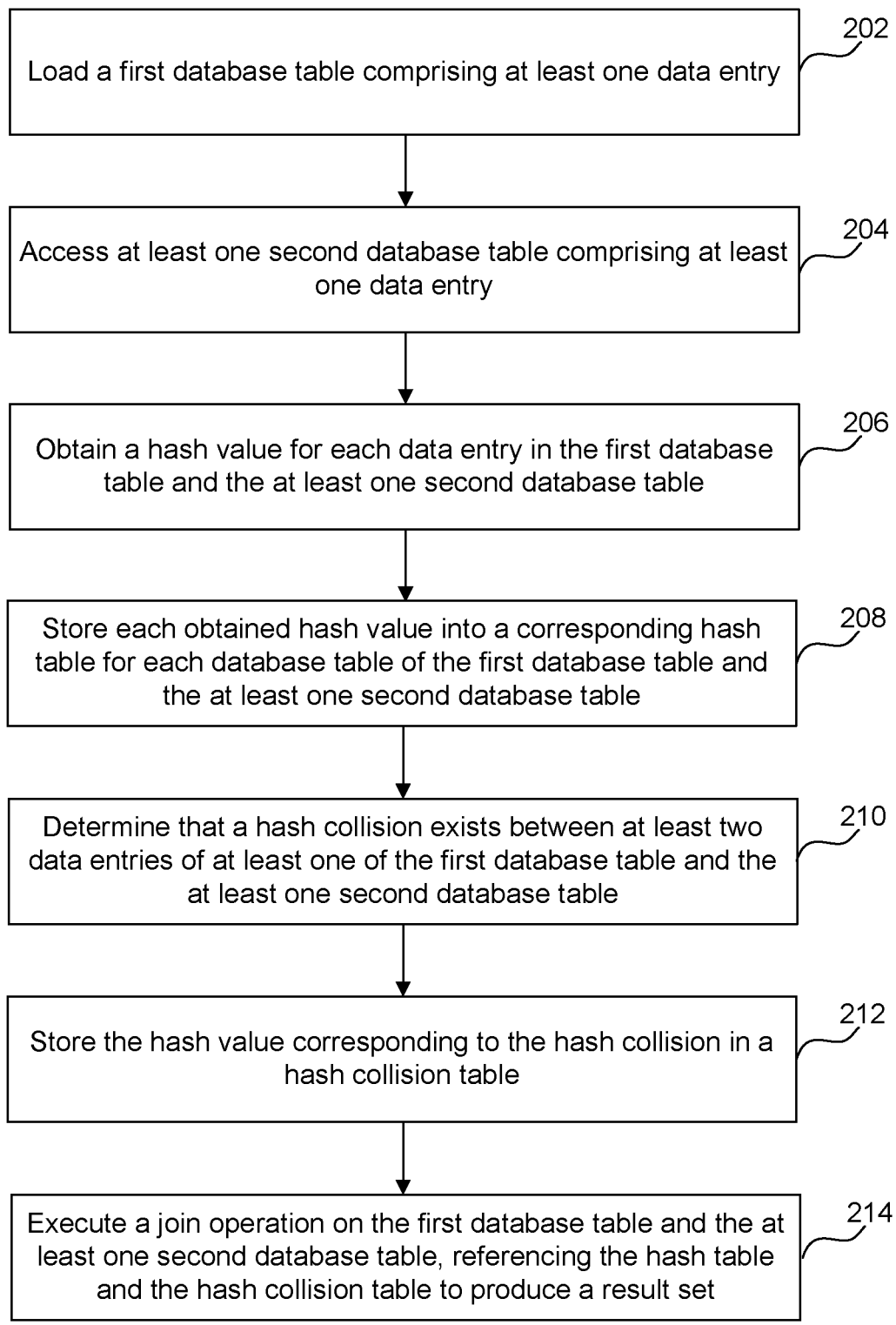
FIG. 2 is a flowchart illustrating a process for referencing hash collision tables for relational join operations, according to some embodiments.

FIG. 2 is a flowchart for a process 200 for performing a join operation referencing a hash table and a hash collision table, according to an embodiment. Process 200 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Process 200 shall be described with reference to FIG. 1. However, process 200 is not limited to that example embodiment.

In 202, processor 104 of system 100 loads a first database table 110 into memory 102, if the first database table 110 is not already loaded. The first database table includes at least one data entry 112. Also in 202, any other database tables that may be needed, such as for a relational operation, may be loaded, concurrently with or subsequent to loading the first database table 110. For example, if a second database table 120 has not yet been loaded but will be needed for an operation, the second database table 120 may be also loaded into memory in 202. The second database table 120 may include at least one data entry 122.

In 204, processor 104 may access the second database table 120. For example, if system 100 or DBMS 106 performs a relational operation on memory-resident database tables, such as a join operation, then at least two database tables in memory 102 may be accessed for processing by processor 104. In some embodiments, this accessing can be to any number of other database tables, and the accessing may take place concurrently, sequentially, randomly, or in any other suitable pattern or order.

In 206, processor 104 obtains a hash value for each data entry in the first database table 110 and the second database table 120. In order to obtain a hash value for any data entry, the data entry is processed with an associated hash function.

For most data entries, the hash function should return a unique hash value for each data entry. In some cases, however, there may be two or more unique data entries which, when input into the same hash function, cause the hash function to return an identical hash value, such that the resulting hash values are not unique. In these cases, a hash collision exists, which is determined in 210 below.

In 208, processor 104 may further store each hash value, obtained in 206, in a hash table 150. Hash table 150 may include multiple hash tables, in which case, hash table 150 would use the same hash function for entries in the same hash table.

In 210, processor 104 may further determine that a hash collision exists between at least two data entries of (1) the first database table 110, (2) the second database table 120, and/or (3) the first database table 110 and the second database table 120. In order to determine whether a hash collision exists among multiple hash values, processor 104, in some embodiments, may execute a comparison operation for each hash value against each other hash value available to system 100 or DBMS 106, such as in hash table 150. In any case where hash values are determined to be equal (matching), corresponding data entries for each matching hash value may then be compared to determine whether the corresponding data entries are also equal or unequal. In cases where the corresponding data entries are not equal, then processor 104 will have successfully determined that a hash collision exists. Aside from this illustrative embodiment, any other well-known methods of hash value comparison may be used for improved efficiency.

In 212, for each case where a hash collision is determined to exist, processor 104 stores the hash collision value corresponding to the hash collision determined in 208 in the hash collision table 160. If the same hash collision value already exists in the table, then the same value need not be additionally stored again in hash collision table 160.

In 214, processor 104 and memory 102 may further execute a database operation, such as but not limited to a join operation, on the first database table 110 and the second database table 120, referencing the hash table 150 and the hash collision table 160 to produce a result set.

Following this process 200, hash table 150 may be fully populated with hash values from each data entry of each of at least two database tables, and hash collision table 160 may be filled as necessary with any hash values that are determined to have collisions among any data entries loaded or accessed from any of the database tables that are loaded or accessed in performing the process 200. Hash collision tables may be built using process 300 described below and shown in FIG. 3.

The join operation may thus be performed irrespective of partitions in either the first database table 110 or any of the at least one second database table 120 or other database tables that may be joined, further improving the memory footprint of memory-resident databases and the speed of database operations.

Any such join operation may be performed with ordinary SQL queries, plan operators, or other programs or routines employing techniques similar to those used in database management.

Although the exemplary embodiments disclosed herein involve multiple different database tables for illustrative purposes, a join operation may reap benefits from referencing hash collision table 160, hash table 150, and resolution dictionary 140, even if only one database table is involved, such as in a case of a self-join, for example. For the purposes of this disclosure, a second database table may also be a copy of the first database table.

The join operation executed may be any of an inner join, a full outer join, a left outer join, a right outer join, a semi-join, a cross join, a natural join, a self-join, an equi-join, a non-equi-join, a theta join, or a hash join, in some non-limiting embodiments. It should be noted that, in some embodiments, a "hash join" as known in the art is different from the process described herein relating to referencing both a hash table and a hash collision table to improve the performance of executing any kind of join operation. Some embodiments may additionally reference a Bloom filter to improve performance further while referencing the hash table and hash collision table.

In some embodiments, the Bloom filter may be a single functional structure used for all database tables. In other embodiments, Bloom filter may include a plurality of Bloom filters each used with an associated database table as it is accessed, in order to reduce processing overhead. Bloom filter may be used generally to determine probabilistically whether or not an element is present in a set of elements, using multiple different hash functions. Bloom filter may take the form of a vector, array, bitmap, bit vector, or similar other type of simplified data structure, for example, to reference other larger or more complex elements in a data set. When another component of system 100 references Bloom filter, Bloom filter may indicate or identify the possibility that an element may be in a data set, and also may indicate or identify, with a higher degree of certainty, that a given element is absent from the data set.

Figure 3:
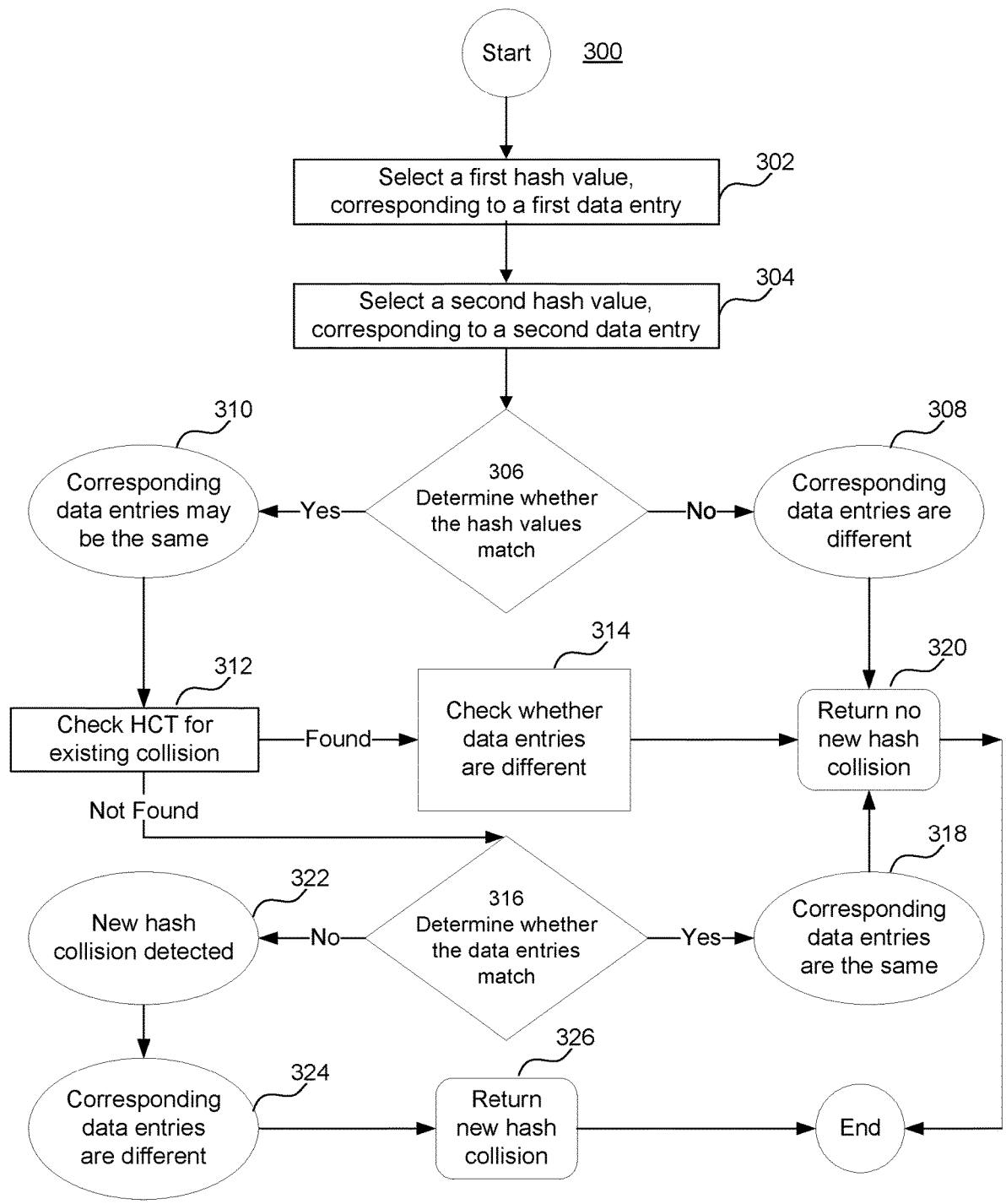
FIG. 3 is a flowchart illustrating a process 300, which shows specifically, according to some embodiments, how a hash collision table may be built. Process 300 goes into greater detail with respect to operations 206-212 of process 200 shown in FIG. 2. In some embodiments, some operations of process 300 may form at least part of a subprocess of operation 412 of process 400 in FIG. 4.

FIG. 3 describes process 300, which shows specifically, according to some embodiments, how a hash collision table may be built. Process 300 goes into greater detail with respect to operations 206-212 of process 200 shown in FIG. 2. In some embodiments, process 300 of FIG. 3 is applied in operation 412 of process 400 described below and shown in FIG. 4.

Process 300 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Process 300 shall be described with reference to FIG. 1. However, process 300 is not limited to that example embodiment.

In 302, processor 104 selects a first hash value, corresponding to a first data entry. This hash value could be selected as retrieved from hash table 150, or it could alternatively be generated on the fly, such as concurrently with or immediately following selection of a data entry from a database table. The corresponding data entry here could refer to any data entry in any database table; the focus of this selection is on the hash value corresponding to the data entry.

Similarly, in 304, processor 104 selects a second hash value, corresponding to a second data entry. Operations 302 and 304 may be executed concurrently or sequentially in any order. These two hash values are selected for comparison, for example, when a database operation is being performed across two database tables, where each of the first database entry and the second database entry are in different database tables of the two database tables across which a database operation is being performed.

In 306, processor 104 determines whether the first hash value matches the second hash value. In other words, processor 104 executes a comparison operation to determine whether or not the two hash values here are equal. If the two hash values here are not equal, execution then proceeds to 308. Otherwise, the first hash value is the same as the second hash value, and execution proceeds to 310.

In 308, it is necessarily determined that, because the hash values are unequal, the corresponding data entries must also be unequal. Processor 104 may set a flag, pass a token by reference or by value, or otherwise signal system 100 or DBMS 106 that the data entries do not match. Such signaling would facilitate performance of a join operation, for example. Execution would also not return any hash collision to be stored in hash collision table 160, such as shown in 320. In some embodiments, a different value may be returned to a calling function, routine, or subroutine, to indicate that no hash collision is to be returned.

In 310, following detection of matching hash values in 306, it is then necessary to test whether the matching hash values are indicative of matching data entries, or instead, if the matching hash values are the result of a hash collision between non-matching data entries. At this point, it is possible that the corresponding data entries are the same, but it is not yet possible to be sure if the hash function used could be expected to produce hash collisions. Execution advances to the decision block of 312.

In 312, processor 104 checks the hash collision table 160 to determine whether the hash values correspond to any hash collision already detected. Specifically, if a hash collision had been detected, its hash collision value would have already been stored in the hash collision table 160, and a comparison of one of the first or second hash values here against all hash collision values in the hash collision table 160 would determine that a hash collision exists if the matching hashes presently being evaluated happen to coincide with an existing, already known hash collision. In this case, where a hash collision is found, in the hash collision table 160, which corresponds to the currently selected hash values, then no new hash collision needs to be added to the hash collision table 160. Still, the corresponding data values must be checked, either directly, or via a resolution dictionary or by other suitable hash collision resolution means, such as in 314.

In 314, the corresponding data values are checked for whether or not they are different from each other. Merely because a hash collision exists does not indicate with certainty that the corresponding data entries are different in this case. Whether the data entries are the same or different, the result of such a direct comparison would be relevant to a database operation, such as a relational join operation, for example. However, direct comparison of each corresponding data entry may not always be necessary in all embodiments. In embodiments where a resolution dictionary is used, the resolution dictionary may be referenced to determine whether such data values from the corresponding hash collision are already known and assigned a unique identifier, such as a special index. If so, then processor 104 can signal system 100 or DBMS 106 by any appropriate means to indicate that the corresponding data entries are different. After resolution dictionary or similar structure is employed, if there is no indication that the data entries are different, then direct comparison of the data entries may be necessary. Although, as in 312 and 320, no new hash collision value would need to be added to the hash collision table, resolution dictionary or similar structures may need to be updated accordingly. If direct comparison reveals that the data entries are indeed different, then any new data entry corresponding to this hash collision may preferably be appended to the resolution dictionary with a new unique identifier. Such new data entry may be the first data entry, the second data entry, or both data entries. Otherwise, the data entries are equal. Processor 104 may also accordingly signal system 100 or DBMS 106 by a return value or similar means, as needed.

If operation 312 did not yield a match with existing hash collision values in the hash collision table 160, then execution proceeds to 316. In 316, processor 104 conducts a direct comparison of the data entries to determine whether the corresponding data entries match.

If the corresponding data entries are the same, then execution proceeds to 318. In 318, processor 104 may signal such information to system 100 or DBMS, to the extent that such information may be needed for database operations, for example. Because there is a definite match between the data entries, then there is no hash collision, and processor 104 may also signal that information, such as by a return value or other suitable means, as in 320.

Following any of 308, 314, or 318, no new hash collision value needs to be added to the hash collision table 160, and execution proceeds to 320. In 320, processor 104 need not perform any particular action. However, in some embodiments, a special signal or value may be set or passed, indicating or identifying such information to any other system that would need to have such information. Following 320, execution of process 300 terminates.

If, in 316, the data entries do not match, this signifies a newly detected hash collision in 322. The newly detected hash collision in 322 further must indicate that the data entries are different, in 324. Processor 104 may signal either or both of these pieces of information to any other system that would need to have such information.

Following the newly detected hash collision, execution then advances to 326. In 326, the newly detected hash collision value is then returned, where it may be forwarded to the hash collision table to be stored for later reference. Execution of process 300 then terminates.

Process 300 may be repeated for any comparison of hash values. For illustrative purposes, FIG. 3 shows only one illustrative embodiment for incrementally building hash tables but this disclosure is not limited to that example embodiment. Other embodiments may further include a Bloom filter and a resolution dictionary 140, each further saving steps in determining whether data values are present and matching. Such information is generally useful in performing many types of database operations.

Process 300 may be used to achieve improvement of system performance in systems or database management systems where data entries are sufficiently large that direct comparison of every entry would consume excessive system resources or be otherwise prohibitive. Furthermore, the incremental building of hash tables, hash collision tables, and Bloom filters additionally streamlines this process 300 to provide a more scalable solution over prior art systems. It should be noted that process 300 and similar embodiments may not necessarily be an optimal solution for all possible database applications, but may be an improvement in some scenarios.

Figure 4:
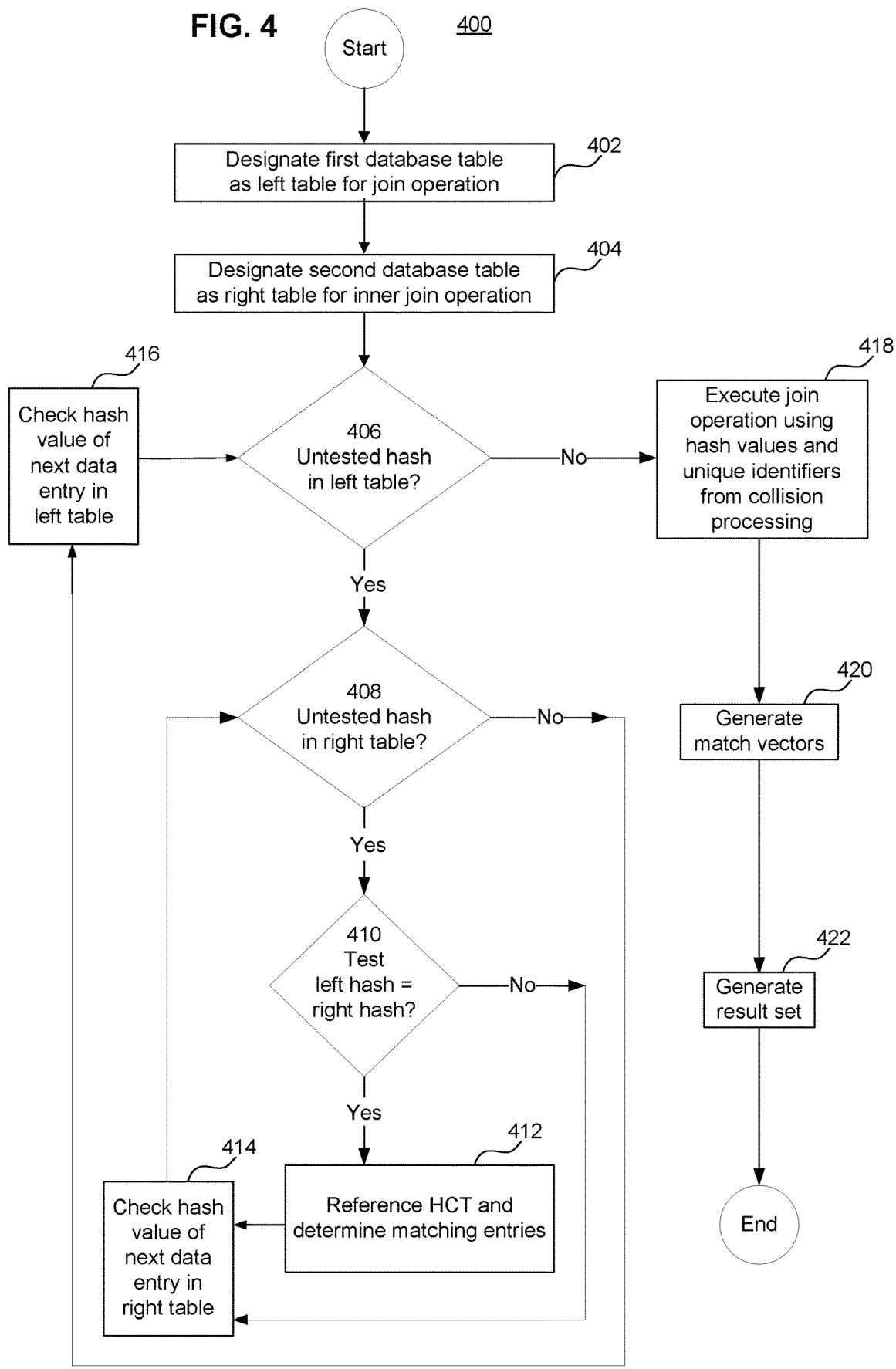
FIG. 4 is a flowchart illustrating a process 400, which shows specifically, according to some embodiments, how a hash collision table and resolution action may be performed in the context of executing a join operation. In some embodiments, process 400 may be at least partially based on operations 310-326 of process 300 of FIG. 3.

FIG. 4 describes process 400, which illustrates an example of one possible join operation using hash table 150 and hash collision table 160. Thus, process 400 of FIG. 4 shows specifically, according to some embodiments, how a hash collision table and accompanying hash collision resolution may be performed in the context of executing a join operation. The example process 400 in FIG. 4 is built around operations 310-326 of process 300. For illustrative purposes, a nested loop is shown, but those skilled in the art would appreciate other well-known methods of iterating and comparing multiple values across multiple tables. Execution of these operations may be performed concurrently or in any feasible order. Process 400 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Process 400 shall be described with reference to FIG. 1. However, process 400 is not limited to that example embodiment.

In 402, processor 104 may designate a first database table as a left table in a multi-table join operation. This designation could be by a predetermined program, function, SQL query, or other suitable means.

In 404, likewise, processor 104 may designate a second database table as a right table in the multi-table join operation. The tables need not be the same size (having the same number of entries), depending on the type of join operation. Where a join operation is performed on more than two database tables, this process of designating left tables and right tables may, in some embodiments, be repeated sequentially across the object set of database tables, such that the result set of one pair of database tables becomes the right table opposite the next database table designated as a left table.

In 406, a hash value of a first data entry of the left table may be selected for comparison by processor 104. Initially, block 406 may run at least once, because left table should have at least one data entry. Upon subsequent iterations, if another hash value remains untested against the hash value(s) corresponding to the data entry of the right table, a hash value of the next data entry in the left table may be selected for comparison. Upon selection of the corresponding hash value of the appropriate data entry of the left table, execution advances to 408.

In 408, a hash value of a first data entry of the right table may be selected for comparison by processor 104 against the hash value of the first data entry of the left table, selected by processor 104 in 406. Initially, 406 will run at least once, because left table should have at least one data entry. Upon subsequent iterations, if another hash value remains untested against the hash value(s) corresponding to the data entry of the left table, a hash value of the next data entry in the right table will be selected for comparison. Upon selection of the corresponding hash value of the appropriate data entry of the right table, execution advances to 410.

In 410, the hash value selected from the appropriate data entry of the left table may be compared against the hash value selected from the appropriate data entry of the right table. If the compared hash values are not equal, then execution proceeds directly to 414, where the right table is checked for another data entry to select its hash value for a subsequent comparison against the same hash value from the left table. Instead, if the values selected previously in 406 and 408 do match, then execution advances to 412.

In 412, processor 104 references hash collision table 160 to determine whether matching hashes correspond to a known hash collision. Data entries corresponding to the previously selected hash values are then compared to determine whether the corresponding data entries match, or instead whether they are distinct data entries that yield a hash collision. In some embodiments, hash collision table 160 may have already been populated or updated in accordance with processes such as those described herein, eliminating the need for further processing during this operation. In some embodiments, this processing may follow the operations of 310-326 in process 300 of FIG. 3, including updating hash collision table 160 and resolution dictionary 140. Following the complete subprocess of 412, execution from here also advances to 414.

In 414, the right table may be checked for another data entry to select its hash value for a subsequent comparison against the same hash value from the left table. Here, 414 may do nothing but pass execution back to 408. In some embodiments, 414 may increment a counter for traversing the right table's data entries. Once there are no more data entries in the right table whose hash values have not been tested against the hash value selected in 406, execution then advances to 416.

In 416, the left table may be checked for another data entry to select its hash value for a subsequent comparison against hash value(s) from the right table. Here, 416 may do nothing but pass execution back to 406. In some embodiments, 416 may increment a counter for traversing the right table's data entries. Once there are no more data entries in the left table whose hash values have not been tested against the hash value(s) of the right table, execution then advances to 418.

Referring back to block 406, if another hash value does not remain untested against the hash value(s) corresponding to the data entry of the right table, then block 418 is performed. In 418, processor 104 may execute the join operation as configured in system 100 or DBMS 106. Instead of directly comparing data entries of each table, where each data entry may be large and cumbersome for comparison, each data entry's hash value may be used, except where there is a collision, in which case one of the resolution techniques described herein may further supplement the use of hash values, such as by including unique identifiers retrieved from a resolution dictionary, for example.

In 420, processor 104 may generate match vectors containing the actual data entries corresponding to the hash values compared in the join operation, further referencing the hash table and/or hash collision table as necessary to resolve hash collisions, which may also be done by probing. Thus, the match vectors form intermediate values by which a final result set may be generated. By way of example, in the case of an inner join, the intermediate result is where match vectors contain original data entries of the left table and matching data entries of the right table, as determined by matching hash values and unique identifiers, in some embodiments. 420 may not be needed in some embodiments. Execution then advances to 422.

In 422, processor generates a result set. The result set may be a view, a materialized view, a separate database table, or any other suitable output. The result set may be generated from match vectors. Finally, for this particular join operation, execution terminates.

In some embodiments, with reference to 410-414, in cases where no hash collision is detected, the join operation may bypass referencing the hash collision table 160, but still may reference the hash table 150 for improved speed in determining matches across different data entries in different database tables.

Returning to FIG. 1, in an exemplary inner join of another embodiment, first database table 110 may be loaded, including multiple partitions where multiple partitions exist. Subsequently or concurrently, at least one second database table 120 may be accessed, including multiple partitions where multiple partitions exist. A corresponding hash value for each data entry in each table may be obtained by searching and returning corresponding values from hash table 150, otherwise calculating hash values that are not yet stored in any hash table. In executing the join operation, hash values of the first database table may be searched against hash table 150 to return the corresponding original data entry values. The hash values may alternatively be stored in a corresponding hash table for each database table, further simplifying the join operation. Hash values corresponding to the data entries for the second database table 120 may be retrieved in the same manner as with the first database table 110. The join operation may probe the second database table for data entries that match data entries of the first database table, disregarding any data entry in the at least one second database table which may have a corresponding hash value that fails to match any hash value of any data entry in the first database table.

After hash collision table 160 has been filled with corresponding hash values of any hash collisions detected among any of the data entries from any of the database tables involved in the join operation, execution of the exemplary inner join may continue. For each hash value in the second database table 120 that matches any hash value in the first database table 110, any matching hash values may be checked against the entries in the hash collision table 160 to determine whether they correspond to detected hash collisions. If the hash collision table 160 is empty, this operation may be skipped, further avoiding processing overhead. If none of the matching hash values correspond to any detected hash collision entries stored in the hash collision table 160, then the join operation may proceed to generate match vectors normally, including the hash values and corresponding data entries of data entries that match across the first database table 110 and the second database table 120 to be merged in the join operation.

In a case where any matching hash values are also determined to match a hash value of a detected hash collision when referencing the hash collision table 160, the join operation will further include an extra action of hash collision resolution. This hash collision resolution may involve directly retrieving the corresponding data entry of the matching hash value from the first database entry and the corresponding data entry of the same matching hash value from the second database entry. Alternatively, the join operation may reference the resolution dictionary 140 to retrieve a unique identifier or the corresponding data entries for any matching hash value that may correspond to a detected hash collision stored in the hash collision table 160.

Upon completion of the hash collision resolution action, the original data entry values corresponding to the hash collision may have been retrieved alongside the matching hash values in each database table. At this point, these original data entry values may be compared. In a case where these values also match, these values then may also be added to the match vectors. Where these values fail to match, then the corresponding value(s) of the second database table may be disregarded in performing this exemplary inner join. After match vectors have been fully generated, they may be used to create a materialized view. Alternatively, other types of result sets may be generated.

As a result of the referencing of hash table 150, a system performing a join operation can avoid considerable processing overhead and memory consumption when performing a join operation on database tables having large data entries. Even in cases where hash collisions occur, referencing hash collision table 160 and/or resolution dictionary 140 in these cases may still considerably reduce processing overhead and memory consumption over conventional methods that do not use hashing, hash tables, or hash collision tables in this manner.

By performing join operations referencing hash tables and hash collision tables that are used in this manner, performance gains may be realized over other methods for certain use cases. It should be noted that such techniques as described herein may not necessarily be an optimal solution for all possible database applications, but may be an improvement in some scenarios. In some cases, the use of hash collision tables as described herein will yield improvement over other known techniques such as using translation tables or global dictionaries. However, actual performance will depend on other independent factors, such as available memory, sharing, and the nature of the data entries in the system or DBMS, among other factors.

While embodiments have been described herein in the context of first and second database tables, in practice the functions described herein can be applied to any number of database tables, as will be appreciated by persons skilled in the relevant arts based on the teachings contained herein.

Figure 5:
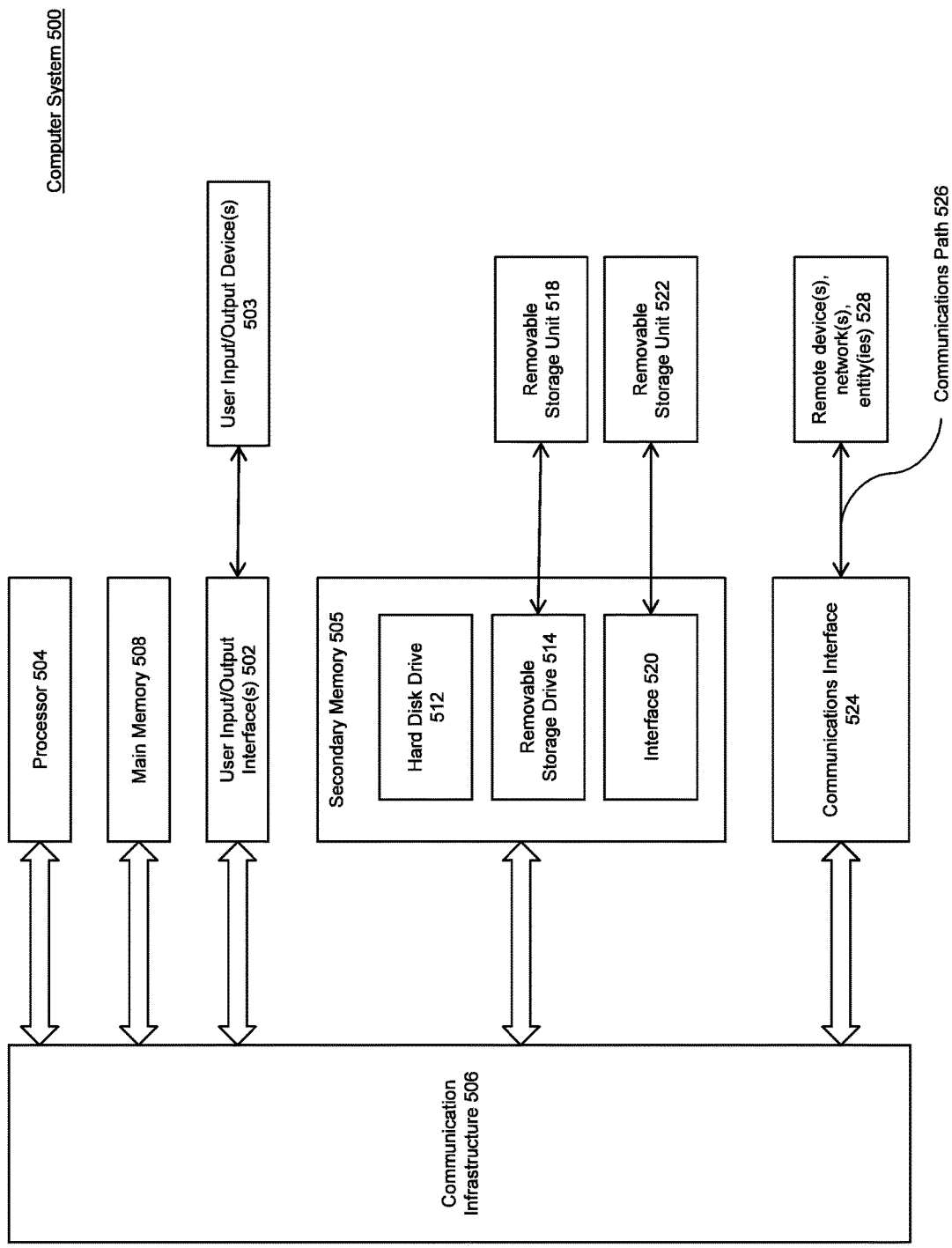
FIG. 5 is an example computer system useful for implementing various embodiments.

Various embodiments can be implemented, for example, using one or more computer systems, such as computer system 500 shown in FIG. 5. Computer system 500 can be used, for example, to implement the structures and operations of FIGS. 1-4.

Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 505, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "some embodiments," "other embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method of performing a relational join, comprising:
    loading, by at least one processor, a first database table comprising at least one data entry;
    accessing, by the at least one processor, at least one second database table comprising at least one data entry;
    obtaining, by the at least one processor, a hash value for each data entry in the first database table and the at least one second database table;
    storing, by the at least one processor, each obtained hash value into a corresponding hash table for each database table of the first database table and the at least one second database table;
    determining, by the at least one processor, that a hash collision exists between at least two data entries of at least one of the first database table and the at least one second database table;
    storing, by the at least one processor, a hash collision value corresponding to the hash collision in a hash collision table;
    generating, by the at least one processor, a resolution dictionary, wherein the resolution dictionary comprises a unique identifier corresponding to each data entry for which a corresponding hash value has been stored in the hash collision table; and
    executing, by the at least one processor, a join operation on the first database table and the at least one second database table, wherein the join operation is configured to produce a result set based at least in part on the hash table, the resolution dictionary, and the hash collision table.

2. The method of claim 1, wherein the join operation when executed causes the at least one processor to reference the resolution dictionary to produce the result set.

3. The method of claim 1, wherein the join operation when executed causes the at least one processor to reference the resolution dictionary to produce a plurality of match vectors.

4. The method of claim 1, wherein the join operation, when executed causes the at least one processor to perform operations comprising:
    in response to determining that the hash collision table has no hash values and has no corresponding data entries, skipping a hash-collision-table checking operation that the at least one processor is configured to perform; and
    producing the result set without referencing the resolution dictionary or the hash collision table.

5. The method of claim 1, wherein the join operation is a relational operation selected from a group consisting of:
    inner join, full outer join, left outer join, right outer join, semi-join, cross join, natural join, self-join, equi-join, non-equi-join, theta join, and hash join.

6. The method of claim 1, wherein the result set is a view, a materialized view, or a separate database table.

7. A system, comprising:
    a memory; and
    at least one processor coupled to the memory and configured to:
        load a first database table comprising at least one data entry;
        access at least one second database table comprising at least one data entry;
        obtain a hash value for each data entry in the first database table and the at least one second database table;
        store each obtained hash value into a corresponding hash table for each database table of the first database table and the at least one second database table;
        determine that a hash collision exists between at least two data entries of at least one of the first database table and the at least one second database table;
        store a hash collision value corresponding to the hash collision in a hash collision table;
        generate a resolution dictionary, wherein the resolution dictionary comprises a unique identifier corresponding to each data entry for which a corresponding hash value has been stored in the hash collision table; and
        execute a join operation on the first database table and the at least one second database table, wherein the join operation is configured to produce a result set based at least in part on the hash table, the resolution dictionary, and the hash collision table.

8. The system of claim 7, wherein the join operation when executed causes the at least one processor to reference the resolution dictionary to produce the result set.

9. The system of claim 7, wherein the join operation when executed causes the at least one processor to reference the resolution dictionary to produce a plurality of match vectors.

10. The system of claim 7, wherein the join operation when executed causes the at least one processor to perform operations comprising:
    in response to determining that the hash collision table has no hash values and has no corresponding data entries, skipping a hash-collision-table checking operation that the at least one processor is configured to perform; and producing the result set without referencing the resolution dictionary or the hash collision table.

11. The method of claim 7, wherein the join operation is a relational operation selected from a group consisting of:

inner join, full outer join, left outer join, right outer join, semi-join, cross join, natural join, self-join, equi-join, non-equi-join, theta join, and hash join.

12. A non-transitory computer-readable medium having instructions stored thereon that, when executed by at least one computing device, causes the at least one computing device to perform operations comprising:

loading a first database table comprising at least one data entry;

accessing at least one second database table comprising at least one data entry;

obtaining a hash value for each data entry in the first database table and the at least one second database table;

storing each obtained hash value into a corresponding hash table for each database table of the first database table and the at least one second database table;

determining that a hash collision exists between at least two data entries of at least one of the first database table and the at least one second database table;

storing a hash collision value corresponding to the hash collision in a hash collision table;

generating a resolution dictionary, wherein the resolution dictionary comprises a unique identifier corresponding to each data entry for which a corresponding hash value has been stored in the hash collision table; and executing a join operation on the first database table and the at least one second database table, wherein the join operation is configured to produce a result set based at least in part on the hash table, the resolution dictionary, and the hash collision table.

13. The non-transitory computer-readable medium of claim 12, wherein the join operation when executed causes the at least one processor to reference the resolution dictionary to produce the result set.

14. The non-transitory computer-readable medium of claim 12, wherein the join operation when executed causes the at least one processor to reference the resolution dictionary to produce a plurality of match vectors.

15. The non-transitory computer-readable medium of claim 12, wherein the join operation when executed causes the at least one processor to perform operations comprising:

in response to determining that the hash collision table has no hash values and has no corresponding data entries, skipping a hash-collision-table checking operation that the at least one processor is configured to perform; and producing the result set without referencing the resolution dictionary or the hash collision table.

16. The non-transitory computer-readable medium device of claim 12, wherein the join operation is a relational operation selected from a group consisting of:

inner join, full outer join, left outer join, right outer join, semi-join, cross join, natural join, self-join, equi-join, non-equi-join, theta join, and hash join.

17. The non-transitory computer-readable medium of claim 12, wherein the result set is a view, a materialized view, or a separate database table.

18. The method of claim 1, wherein the executing the join operation is performed in response to a determination that no untested hash is present in at least one of the first database table or the second database table.

19. The method of claim 18, wherein the executing the join operation is a self-join.

20. The method of claim 18, wherein the determination that no untested hash is present in at least one of the first database table or the second database table is made by the at least one processor referencing a Bloom filter.

* * * * *